United States Patent [19]
Dickhut et al.

[11] Patent Number: 4,718,844
[45] Date of Patent: Jan. 12, 1988

[54] CORRUGATED MOLD BLOCK

[75] Inventors: Heinrich Dickhut, Charleston; John S. Berns, Cleveland, both of Tenn.

[73] Assignee: Cullim Machine Tool & Die, Inc., Cleveland, Tenn.

[21] Appl. No.: 19,581

[22] Filed: Feb. 27, 1987

[51] Int. Cl.⁴ .............................................. B29C 49/34
[52] U.S. Cl. .................................... 425/522; 425/336; 425/388
[58] Field of Search ............... 425/370, 371, 326, 336, 425/233, 526, 532, 538, 539, 354, 405 R, 387.1, 388, 417, 290, 522

[56] References Cited

U.S. PATENT DOCUMENTS

| | | | |
|---|---|---|---|
| 2,866,230 | 12/1958 | Holte | 425/324.1 |
| 3,538,209 | 11/1970 | Hegler | 264/508 |
| 3,751,541 | 8/1973 | Hegler | 264/508 |
| 3,864,446 | 2/1975 | Maroschak | 264/506 |
| 3,891,733 | 6/1975 | Maroschak | 425/142 |
| 3,924,992 | 12/1975 | Hegler | 425/142 |
| 3,981,663 | 9/1976 | Lupke | 425/326.1 |
| 4,184,831 | 1/1980 | Hegler et al. | 425/290 |
| 4,212,618 | 7/1980 | Hegler et al. | 425/326.1 |
| 4,226,580 | 10/1980 | Lupke et al. | 425/336 |
| 4,319,872 | 3/1982 | Lupke et al. | 425/532 |
| 4,365,948 | 12/1982 | Chaplain | 425/417 |
| 4,439,130 | 3/1984 | Dickhut et al. | 425/388 |
| 4,492,551 | 1/1985 | Hegler et al. | 425/532 |

FOREIGN PATENT DOCUMENTS 609745 11/1960 Canada ............................. 264/286
902314 6/1972 Canada .

Primary Examiner—Willard Hoag
Attorney, Agent, or Firm—Wood, Dalton, Phillips, Mason & Rowe

[57] ABSTRACT

A corrugated mold block for a vacuum mold machine is provided with a face arcuate about a longitudinal axis and corrugated in the longitudinal direction with alternating grooves and lands, said face being formed of sheet metal. A housing is provided about the back of the face and adapted for carriage about an endless path, and reinforcing members are provided which are secured to the face and housing and extend therebetween to maintain the desired shape of the face. Openings extend through the grooves of the face to the back thereof and communicate with vacuum passageways formed by a plurality of arcuate channel members secured to the back of each of the face grooves and communicating with a vacuum port through the housing. The housing further defines a cooling passage therethrough in communication with input and output cooling ports through the housing. The reinforcing members are disposed substantially radial to the arc of the face and include finger portions extending into the lands thereof and openings therethrough which form a part of the cooling passage. A sealant is provided on one side of the mold block and adapted to seal against an adjacent mold block during molding.

17 Claims, 5 Drawing Figures

CORRUGATED MOLD BLOCK

DESCRIPTION

1. Technical Field

The present invention relates to mold blocks for vacuum mold machines, are more particularly to corrugated mold blocks circulated about an endless path and adapted to form corrugated pipes.

2. Background Art

A well-known method for manufacturing corrugated pipes is to extrude a tube of thermoplastic from a head and then conform that tube to the interior of a corrugated mold tunnel formed by mold blocks. The mold blocks typically come in pairs and mate together to form a portion of the mold tunnel, and the thermoplastic is either blown into its shape (by pressure created within the plastic tunnel) or by vacuum (where vacuum draws the air from around the plastic tunnel).

Two structures which have been used in the vacuum method of manufacture are illustrated in U.S. Pat. Nos. 4,319,872 and 4,439,130. The mold blocks shown in these patents are, as is typical of the prior art, formed of solid metal and machined to the desired configuration. Such structures use large amounts of metal, which thereby becomes a cost factor in manufacturing the mold blocks, and also causes the mold blocks to be heavy and difficult to handle. Inasmuch as a large number of such mold blocks may be replaced in a mold machine when different size tubes are to be manufactured, this handling difficulty can be significant, making changeovers time consuming and therefore costly.

The thermoplastic which is used in making the corrugated tube is at elevated temperatures when the plastic comes from the head. It is important that the mold blocks be adequately cooled in order to set the plastic in the desired shape, but the bulk of the blocks makes this difficult inasmuch as the large amounts of metal in the block tend to retain the heat. After the blocks have been continuously used for long periods of time, it is particularly difficult to adequately cool them, making it difficult to set the plastic adequately when it is conformed thereto.

Still further, the bulk of the mold blocks of the prior art have made it difficult to provide an adequate uniform vacuum about the interior of the mold tunnel, though this difficulty has in large part been overcome by the mold block structure of U.S. Pat. No. 4,439,130.

The present invention is directed toward overcoming one or more of the problems as set forth above.

SUMMARY OF THE INVENTION

In one aspect of the present invention, a corrugated mold block for a vacuum mold machine is provided with a face arcuate about a longitudinal axis and corrugated in the longitudinal direction with alternating grooves and lands, said face being formed of sheet metal. A housing is provided about the back of the face and adapted for carriage about an endless path, and reinforcing members are provided which are secured to the face and housing and extend therebetween to maintain the desired shape of the face. Openings extend through the grooves of the face to the back thereof and communicate with a vacuum passageway defined in the housing, said vacuum passageway communicating with a vacuum port through the housing.

In another aspect of the present invention, the vacuum passageway is formed by a plurality of arcuate channel members secured to the back of each of the face grooves. The housing further defines a cooling passage therethrough in communication with input and output cooling ports through the housing.

In yet another aspect of the present invention, the reinforcing members are disposed substantially radial to the arc of the face and include finger portions extending into the lands thereof. These reinforcing members include openings therethrough which form a part of the cooling passage.

In still another aspect of the present invention, a sealant is provided on one side of the mold block to provide a seal against adjacent mold blocks during molding.

It is an object of the present invention to provide a mold block which minimizes the material used in construction in order to minimize its cost.

Another object of the present invention is to minimize the weight of the mold blocks to ease handling of the blocks.

Still another object of the present invention is to provide a mold block adapted to draw a strong and uniform vacuum about the mold tunnel in order to properly conform the thermoplastic to the shape of the mold.

Another object of the present invention is minimize leaks in the mold tunnel to maximize the vacuum efficiency during molding.

Yet another object of the present invention is to provide mold blocks which may be easily and inexpensively cooled to both provide for a quick set of the plastic to the mold shape during molding, and to adequately cool the mold blocks between repeated uses in molding.

DESCRIPTION OF THE PREFERRED EMBODIMENT

Figures 1, 2:
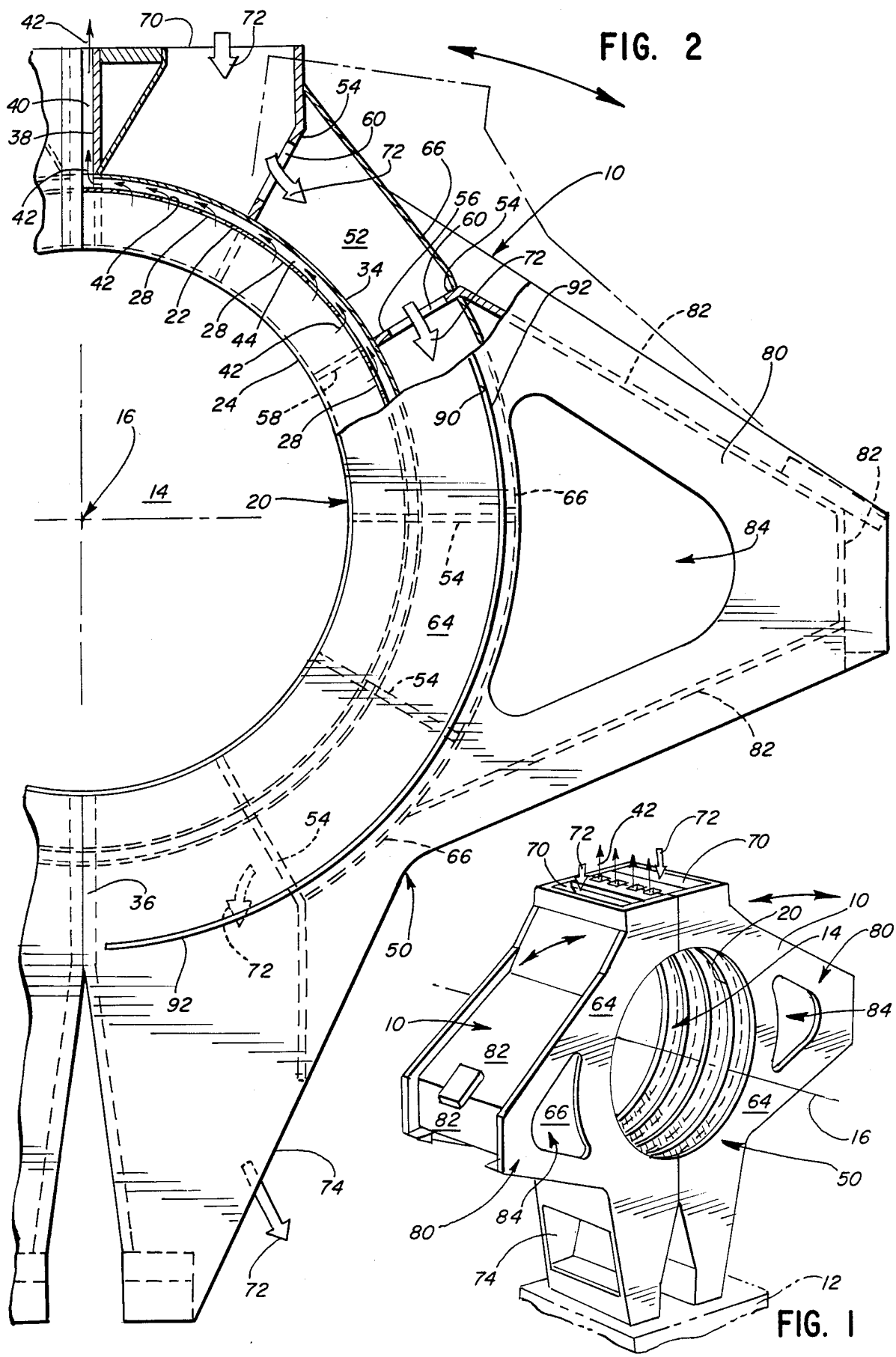
FIG. 1 is a perspective view of a pair of mold blocks embodying the present invention.
FIG. 2 is a partial cross-sectional side view of a mold block embodying the present invention.

A pair of mating mold blocks 10 is shown in perspective in FIG. 1 pivotably mounted to a carriage (shown in schematic form at reference numeral 12 in FIG. 1). When together as shown in FIG. 1, each mold block pair forms a portion of a mold tunnel 14 about a longitudinal axis 16.

With the embodiment illustrated in FIG. 1, two mold blocks 10 would be carried about one endless track by a single carriage 12 in a clam shell type of operation such as shown in U.S. Pat. No. 4,439,130, the disclosure of which is hereby incorporated by reference. As will be understood by a skilled artisan, the carriage 10 circulates about an endless track or path with the mold blocks 10 separated as the blocks pass an extruder head (which dispenses heated, thermoplastic in a cylindrical fashion). The mold blocks 10 are then brought together as shown in FIG. 1 to define the mold tunnel 14 (together with adjacent pairs of mold blocks), and a vacuum draws the thermoplastic against the walls of the mold tunnel 14 to form the corrugated tube or pipe.

It should also be understood that mold blocks 10 embodying the present invention could be used in a system such as shown in U.S. Pat. No. 4,319,872, with the two mold blocks of each pair carried on opposite endless tracks, mated together along a portion of the tracks to form a mold tunnel.

Reference will now be had to the detailed structure of a mold block 10 of the present invention. Though only one mold block 10 will be described, it should be understood that the other mold block 10 in each pair will be identical to (and turned 180° from) the mold block 10 being described.

Figure 3:
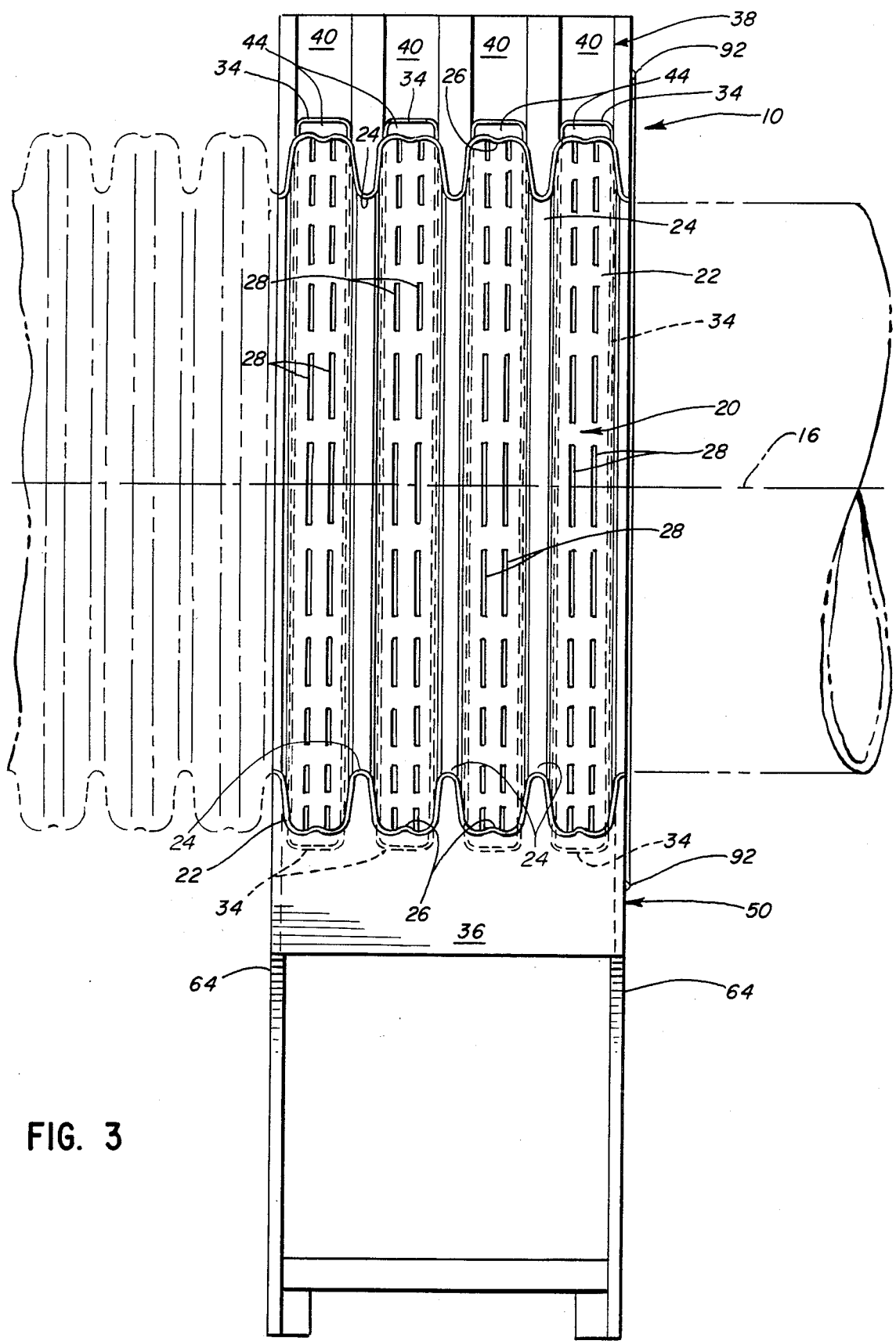
FIG. 3 is a facial view of a mold block embodying the present invention (as would be seen from the left in FIG. 2)

As best shown in FIG. 3, the mold surface is defined by a corrugated face 20 with alternating grooves 22 and lands 24 and substantially 180° arcuate about the longitudinal axis 16 (see FIG. 2). The face 20 should be sheet metal made of, e.g., stainless steel, brass, copper, or aluminum, which will not deteriorate when subjected to the temperatures of the thermoplastic and which will maintain the desired shape (when reinforced as described hereinafter). The gage of metal required for the face 20 will vary depending on the diameter of pipe to be made.

The grooves 22 are formed with a ridge 26 extending along their bottom (see FIG. 3) and openings or slits 28 are intermittently cut along both sides of the ridge 26, which thereby acts to both strengthen the face 20 and to maximize the ability of the vacuum mold process to draw air from the mold tunnel 14.

Figure 4:
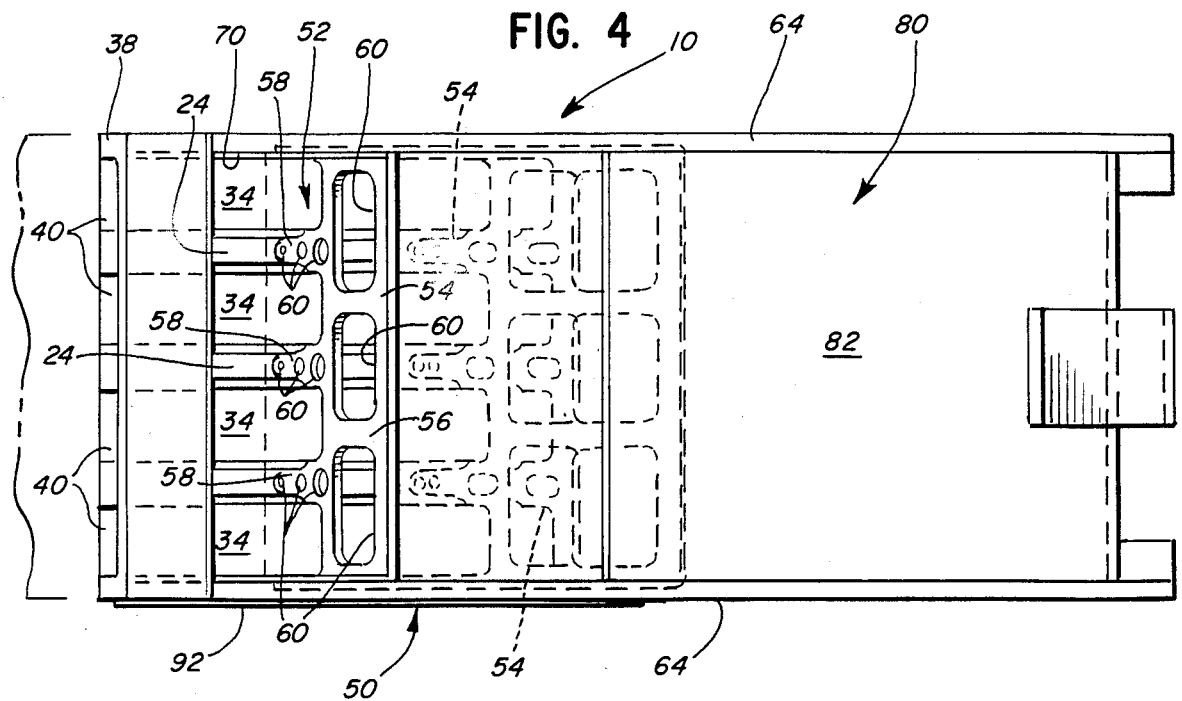
FIG. 4 is a top view of a mold block embodying the present invention.
Figure 5:
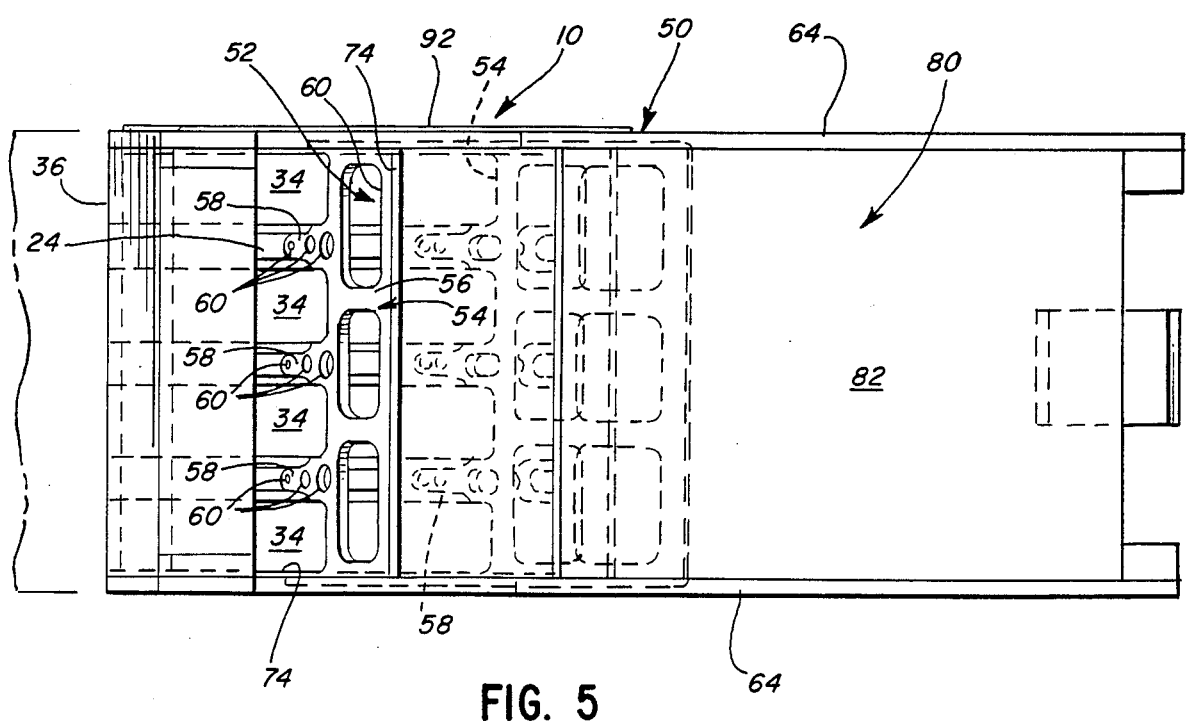
FIG. 5 is a bottom view of a mold block embodying the present invention.

Channel members 34 are suitably secured (as by welding) to the backside of each groove 22 of the face 20. The channel members 34 are U-shaped troughs which are curved about the longitudinal axis 16 through an angle of slightly less than 180°. At one end, the channel members 34 are closed by an end plate 36 shaped to conform to the configuration of the face 20. At the other end, the channel members 34 open into a vacuum header 38 which, together with a mating header of the other mold block 10 of the pair, define vacuum passageways 40 open at the top of the mold block pair (see FIGS. 2 and 4).

As will be understood by a skilled artisan, vacuum manifolds can be provided adjacent the mold tunnel 14 so as to communicate with the header vacuum passageways 40 during molding. Accordingly, as indicated by arrows 42, a vacuum is drawn through the header vacuum passageways 40, the vacuum passageways 44 defined by the channel members 34, and the slits 28, thereby inducing a strong, uniform vacuum around the mold tunnel 14.

A housing 50 is further provided with the face 20 which, as will become apparent, both supports the face 20 and defines a cooling passage 52.

Specifically, a number of reinforcing members or braces 54 are suitably fixed (as by welding) to the back of the face 20 and are radially disposed relative to the longitudinal axis 16. The braces 54 are comb-shaped, having plates 56 with fingers 58 extending into the face lands 24 from the back, the fingers 58 being shaped to conform to the face back with the channel members 34 thereon. Openings 60 are provided in both the plates 56 and fingers 58 for cooling as is further described hereafter.

The housing 50 further includes side plates 64 suitably fixed (as by welding) to the sides of the face 20 and braces 54. A passage wall 66 substantially arcuate about the longitudinal axis 16 is suitably fixed to the braces 54 and side plates 64. The cooling passage 52 is thus defined around the back of the face 20 so that, by blowing cool air into the input port 70 at the mold block top (see FIG. 2), cool air is caused to circulate in the direction of the arrows 72 through the brace openings 60, taking heat from the face 20 out the output port 74.

As will be understood by the skilled artisan, suitable manifolds (not shown) would be provided within the machine to communicate with the input and output cooling ports 70, 74 to cause the circulation of cooling air at desired portions along the endless tracks.

The cooling efficiency of this mold block 10 is much greater than with the bulk metal mold blocks of the prior art. The cooling air may be introduced adjacent to the mold tunnel 14 through a relatively thin metal sheet (i.e., the face 20) during molding. Further, the minimal amount of metal in the mold block 10 reduces the amount of heat which might be retained. Still further, the braces 54 function as air fins by taking heat from the face 20 and distributing it across the surfaces of the braces 54 which face the flow of cooling air.

Returning now to a description of the housing 50 in general, a wing 80 is preferably provided as best shown in FIGS. 1 and 2. The side plates 64 extend into this wing 80 and are spaced by addition back walls 82. The wings 80 serve to enhance the rigidity of the mold block 10 and further define a longitudinal passage 84 which may also be cooled by air from suitable air plenums (not shown) to still further enhance air cooling efficiency.

As shown in FIG. 2, a channel 90 may also be defined in one side plate 64 of the mold block 10 and a sealant 92, such as a portion of an O-ring, suitably secured therein. This sealant 92 projects slightly (e.g., ten thousandths of an inch) above the surface of the side plate 64 so that it abuts against the side of an adjacent mold block pair along the mold tunnel 14 to prevent the vacuum induced in the mold tunnel 14 from drawing undesirable ambient air into the tunnel 14. As will be apparent to a skilled artisan, such a sealing structure can also be provided in other mold block structures, including those bulk metal blocks of the prior art.

Other aspects, objects and advantages of the present invention may be obtained from a study of the drawings, specification and appended claims.

What is claimed is:

1. A corrugated mold block for a vacuum machine for molding corrugated tubes, said block being movable about an endless path, comprising:
    a sheet metal face member substantially arcuate about a longitudinal axis and corrugated with alternating circumferential grooves and lands, said member having openings through to the back thereof and communicating with said grooves;
    a housing around the back of said face member;
    bracing members secured to and extending between the rear of said face member and said housing;
    channel members about the back of said face member adjacent said grooves and communicating therewith, said channel members defining vacuum passageways for removal of gases through said face member openings; and
    vacuum ports through said housing and communicating with said vacuum passageways.

2. The corrugated mold block of claim 1, wherein the housing defines a cooling passage around the back of said face member, and further comprising input and output coolant ports through said housing and communicating with said cooling passage.

3. The corrugated mold block of claim 2, wherein the bracing members have openings allowing the passage of coolant therethrough, said bracing members being disposed in and substantially perpendicular to the flow through the cooling passage.

4. The corrugated mold block of claim 1, wherein the face is arcuate through substantially 180°.

5. The corrugated mold block of claim 1, wherein the bracing members extend substantially radially from the back of the arcuate face member.

6. The corrugated mold block of claim 5, wherein the bracing members include fingers which extend into a land defining portion of said face member from the back of the face member.

7. The corrugated mold block of claim 1, further comprising a seal on one side of the mold block, said sealant being abutable with an adjacent mold block during molding.

8. A corrugated mold block for a vacuum machine for molding corrugated tubes, said block being movable about an endless path, comprising:
    a sheet metal face substantially arcuate about a longitudinal axis and corrugated with alternating circumferential grooves and lands, said face member having openings through to the back of the face member and communicating with said grooves;
    a housing around the back of said face member;
    bracing members secured to the rear of said face member and extending between said face member and said housing;
    a vacuum passageway defined in said housing, said passageway communicating with said openings to draw gases therethrough; and
    a vacuum port through said housing and communicating with said vacuum passagway.

9. The corrugated mold block of claim 8, further comprising arcuate channel members secured to the back of said face member and defining a vacuum passageway for each said groove.

10. The corrugated mold block of claim 9, further comprising input and output cooling ports through said housing and communicating with a cooling passage defined in said housing about the back of said face.

11. The corrugated mold block of claim 9, wherein the housing defines a cooling passage around the back of said face, and further comprising input and output coolant ports through said housing and communicating with said cooling passage.

12. The corrugated mold block of claim 11, wherein the bracing members have openings allowing the passage of coolant therethrough, said bracing members being disposed in and substantially perpendicular to the flow through the cooling passage.

13. The corrugated mold block of claim 8, wherein the face is arcuate through substantially 180°.

14. The corrugated mold block of claim 8, wherein the bracing members extend substantially radially from the back of the arcuate face.

15. The corrugated mold block of claim 14, wherein the bracing members include fingers which extend into the lands from the back of the face.

16. The corrugated mold block of claim 8, further comprising a sealant on one side of the mold block, said sealant being adapted to abut an adjacent mold block during molding.

17. A corrugated mold block for a vacuum machine for molding corrugated tubes, said block being movable about an endless path, comprising:
    a sheet metal face member substantially arcuate about a longitudinal axis and corrugated with alternating circumferential grooves and lands, said face member having openings through to the back of the face member and communicating with said grooves;
    a housing defining a cooling passage around the back of said face member;
    bracing members secured to and extending between said face member and said housing in a direction substantially radial to the longitudinal axis of a pair of mated said blocks, said bracing members having openings therethrough;
    input and output coolant ports through said housing and communicating with said cooling passage;
    channel members about the back of said face member and communicating with said grooves, said channel members defining vacuum passageways adjacent said grooves and communicating to draw gases through said face openings; and
    vacuum ports through said housing and communicating with said vacuum passageways.

* * * * *